United States Patent [19]
Broyles

[11] Patent Number: 6,135,020
[45] Date of Patent: Oct. 24, 2000

[54] NUT SHELLER BYPASS

[76] Inventor: David J. Broyles, 1016 County Rd. E., Lamesa, Tex. 79331

[21] Appl. No.: 09/226,963

[22] Filed: Jan. 8, 1999

Related U.S. Application Data

[63] Continuation-in-part of application No. 08/963,733, Nov. 4, 1997, Pat. No. 5,879,734.

[51] Int. Cl.⁷ ..................................................... A23L 1/00
[52] U.S. Cl. ............................ 99/569; 426/481; 426/482
[58] Field of Search .............................. 99/569; 426/481, 426/482, 483, 632

[56] References Cited

U.S. PATENT DOCUMENTS

| | | | |
|---|---|---|---|
| 853,066 | 5/1907 | Crellin | 99/569 |
| 1,564,914 | 12/1925 | Vaughn . | |
| 1,594,702 | 8/1926 | Williams . | |
| 2,265,588 | 12/1941 | Walker | 146/8 |
| 2,279,987 | 4/1942 | Guerra | 146/8 |
| 2,319,757 | 5/1943 | Vigneau | 99/569 |
| 2,504,374 | 4/1950 | Baldwin | 146/11 |
| 2,506,848 | 5/1950 | Turner | 146/11 |
| 4,347,260 | 8/1982 | Crompton | 426/483 |
| 5,467,700 | 11/1995 | Dowell et al. | 99/570 |

*Primary Examiner*—Anthony J. Weier
*Attorney, Agent, or Firm*—Wendell Coffee; Mark Scott

[57] ABSTRACT

In a plant for mass mechanical shelling of nuts having a cracker, sheller, and air separators, this process bypasses the sheller with some cracked nuts. Nuts and nut parts created in the cracker are sent to bypass structure where in successive operations, the nuts are separated by width then by thickness. Those nuts having the largest width are shelled by parallel rubber coated cylinders. The remaining nut parts having smaller thickness/width ratios bypass the sheller of the prior art. Parts having larger thickness/width ratios are sent to the sheller of the prior art. The process is performed by screens which separate the cracked nut parts by width. For each width of nut parts, slots between revolving cylinders, separate the larger thickness parts from the smaller thickness parts.

14 Claims, 10 Drawing Sheets

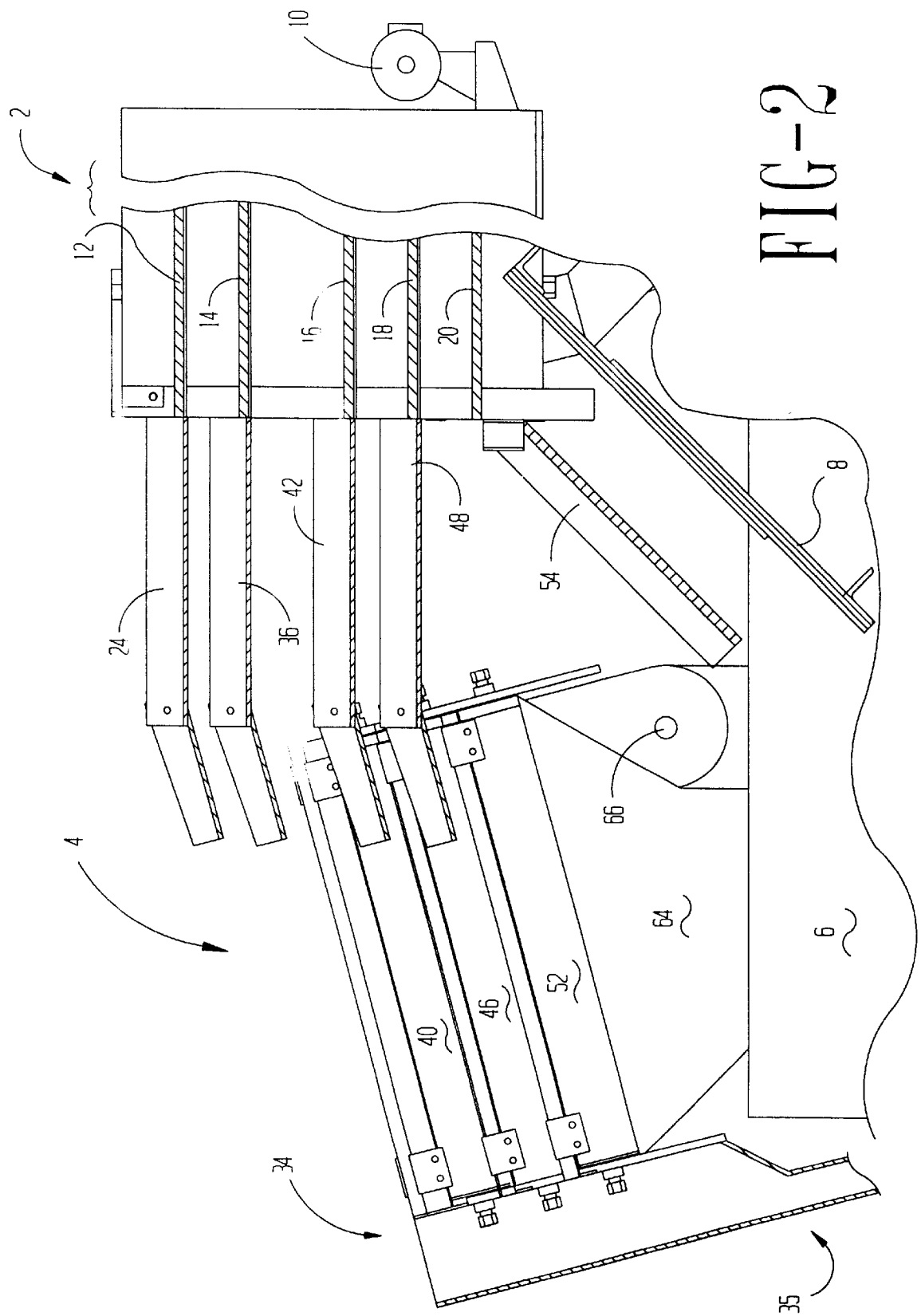

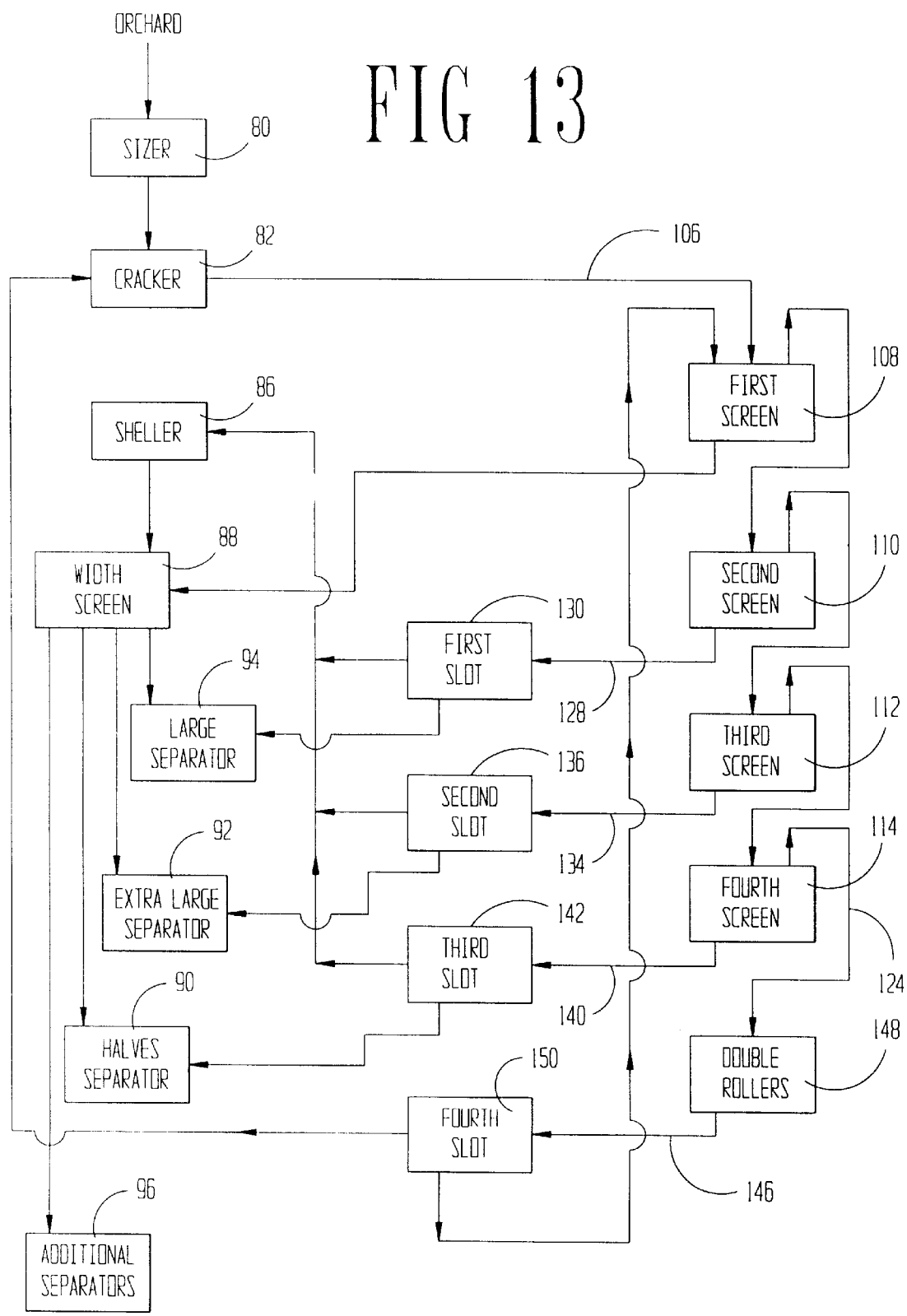

NUT SHELLER BYPASS

CROSS REFERENCE TO RELATED APPLICATION

This application is a Continuation-in-Part of application Ser. No. 08/963,733, filed Nov. 4, 1997. Said application is now U.S. Pat. No. 5,879,734 Issued on Mar. 9, 1999.

Applicant filed Disclosure Document Number 412,574 on Feb. 20, 1997 which document concerns this application; therefore, by separate paper it is respectfully requested that the document be retained and acknowledgment thereof made by the Examiner. (MoPEP 1706).

BACKGROUND OF THE INVENTION (1) Field of the Invention

This invention relates to the shelling of pecans. Operators of pecan shelling operations have ordinary skill in this art.

(2) Description of the Related Art

The state of the art for mass mechanical shelling of pecans comprises many steps. Pecans are initially harvested from an individual orchard and delivered to a pecan shelling facility.

A pecan shelling facility is schematically shown in FIG. 7. Normally the pecans from an orchard will be of a single variety. At the pecan shelling facility, the pecans are first separated by a sizer 80. Sizing pecans from an orchard involves separating by thickness. Since the ratio of a pecan's thickness to its length and width is substantially constant for a particular pecan variety, separating by thickness is sufficient to group pecans of substantially the same thickness, width, and length. Pecan sizes are numbered in accordance with their thickness in sixteenths of an inch, e.g. a group of pecans with a thickness of $13/16$" are size 13 pecans.

The next step in the shelling process involves feeding pecans of a particular size to a cracker 82. Having the pecans separated by sizes allows for optimal performance of the cracker.

After the pecans are cracked according to standard practice before this invention, everything that comes out of the cracker is called cracker product 84. The cracker product (including whole uncracked pecans) is fed to a plant sheller 86. The sheller, as the name implies, further releases or frees any of the woody outer shell from the meat product therein.

The output of the sheller is then fed to a series of screens 88. The screens separate the sheller product by width, and each width range is fed individually to air separators. In the air separation process, meat from the pecan is separated from any of the woody shell by operation of the lighter shell pieces moving with air.

The meat is separated into different batches for use. In order of value, these will be halves, extra large pieces, large pieces, medium, and smalls and midgets. The air separator will generally be identified as halve separator 90, extra large separator 92, large separator 94, and medium, small, and midget separator units 96.

As described above, the sized pecans are fed to a cracker. When pecans leave the cracker, 25%–50% of the total possible meats halves are completely separated from the shells. When a portion of the shell remains attached to the meat it is referred to as a "sticktight". When the meat is entirely free from the shell it is referred to as "sticktight free"; therefore, after cracking, 25%–50% of the meat from the pecans will be sticktight free. According to present practice all of the cracked pecans, even those that are sticktight free, are fed to the sheller. The sheller's main purpose is to remove the woody shell portion from sticktights; therefore, feeding the sticktight free meat halves to the sheller often breaks the sticktight free meat halves and other meat portions thereby reducing their value.

SUMMARY OF THE INVENTION (1) Progressive Contribution to the Art

The invention herein describes an improved process, and related structure, for increasing the efficiency of the shelling process as well as decreasing the loss of value caused by damaging sticktight free meat.

This invention describes a process and structure to separate the sticktight free meat (both halves and parts) from the sticktights and thereby by-pass the sheller with those portions of the pecan meat that are sticktight free after cracking alone. This by-pass increases efficiency by reducing the amount of meat loss in the process by not sending the sticktight free meat to the sheller where it is often further broken.

This invention also describes a unique method and structure for quickly shelling substantially whole partially cracked pecans. The result is achieved by passing the substantially whole cracked pecans through the slot formed between a pair of rubber coated cylinders. The slot formed therein is slightly smaller than the whole uncracked pecans. As the whole partially cracked pecans pass through the slot, the shell is further broken from the meat. Whole uncracked pecans move unaffected through the slot formed by the rubber coated cylinders.

(2) Objects of this Invention

An object of this invention is to increase the output of pecan halves and large pieces from a shelling plant.

Another object of this invention is to separate sticktight free meat, in various sizes, from the remaining cracker product such that the separated meat portions are not processed through the sheller.

Another object of this invention is to separate out whole, uncracked pecans and route those whole uncracked pecans back to the cracker.

Yet another object of this invention is to quickly shell substantially whole cracked pecans and separate the sticktight free meat halves therefrom before passing the remainder to the sheller.

Further objects are to achieve the above with devices that are sturdy, compact, durable, simple, safe, efficient, versatile, ecologically compatible, energy conserving, and reliable, yet inexpensive and easy to manufacture, install, operate, and maintain.

Other objects are to achieve the above with a method that is rapid, versatile, ecologically compatible, energy conserving, efficient, and inexpensive, and does not require highly skilled people to install, operate, and maintain.

The specific nature of the invention, as well as other objects, uses, and advantages thereof, will clearly appear from the following description and from the accompanying drawings, the different views of which are not necessarily scale drawings.

BRIEF DESCRIPTION OF THE DRAWINGS

FIG. 2 is a side sectional view of the machine of FIG. 1, as seen from line 2—2 of FIG. 4 with the feed end to the right and the sheller end to the left. Stated otherwise if one were looking from the sheller end it would be the right side of the machine.

FIG. 13 is a flow diagram of the linear screen embodiment of this invention.

FIG. 14 is a perspective side view of the sheller-separator assembly with the frame portions removed for clarity.

CATALOGUE OF ELEMENTS

Figure 1:
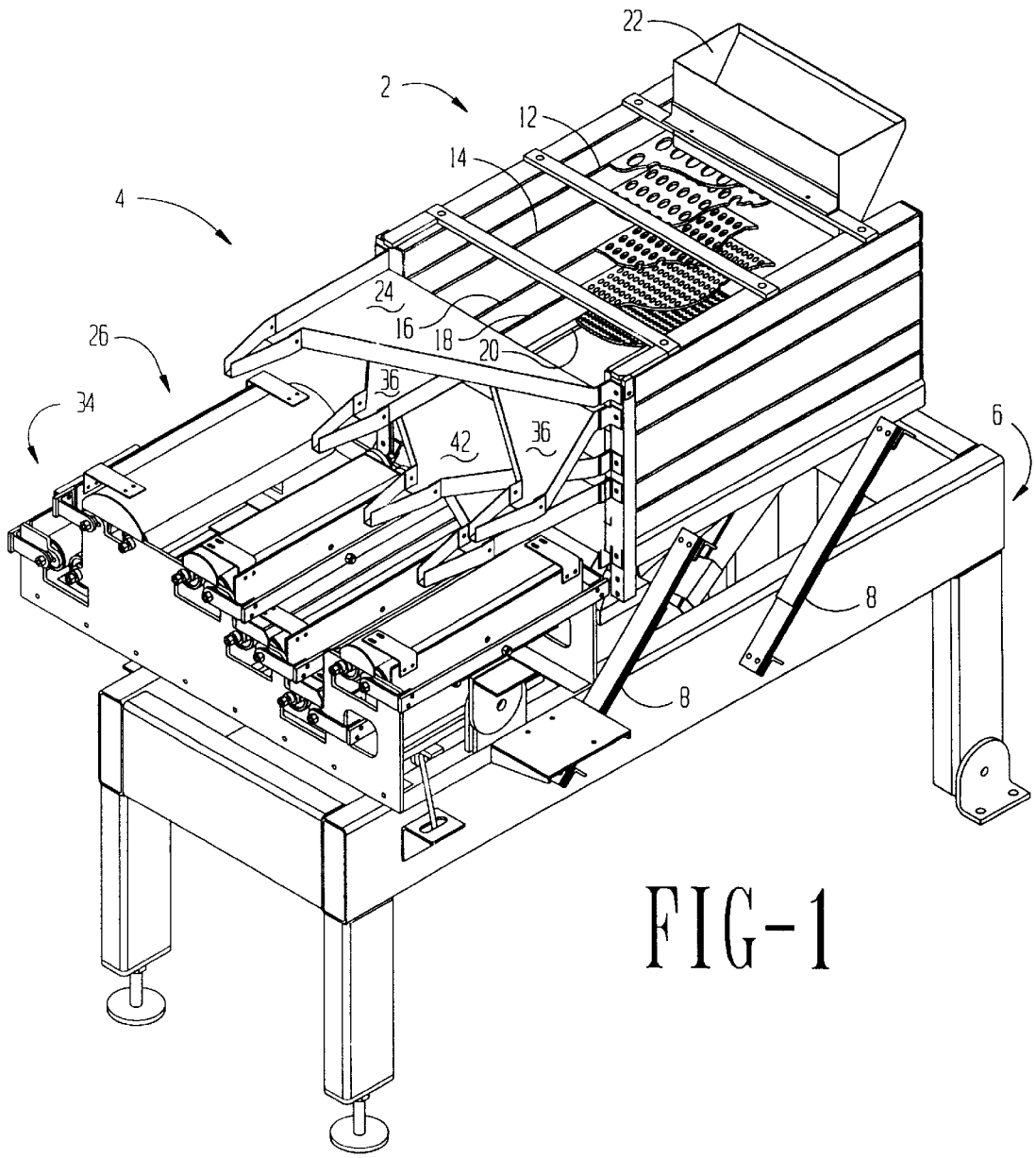
FIG. 1 is a perspective view of the first embodiment of this invention from above the sheller end looking down toward the feed end.
Figure 5:
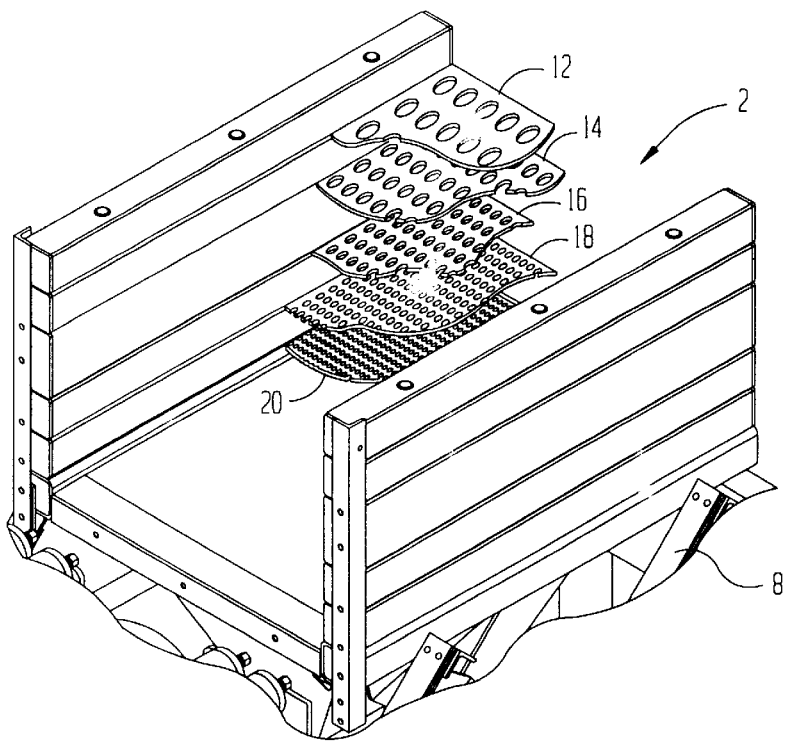
FIG. 5 is an enlarged perspective view of the screen assembly of FIG. 1.
Figure 3:
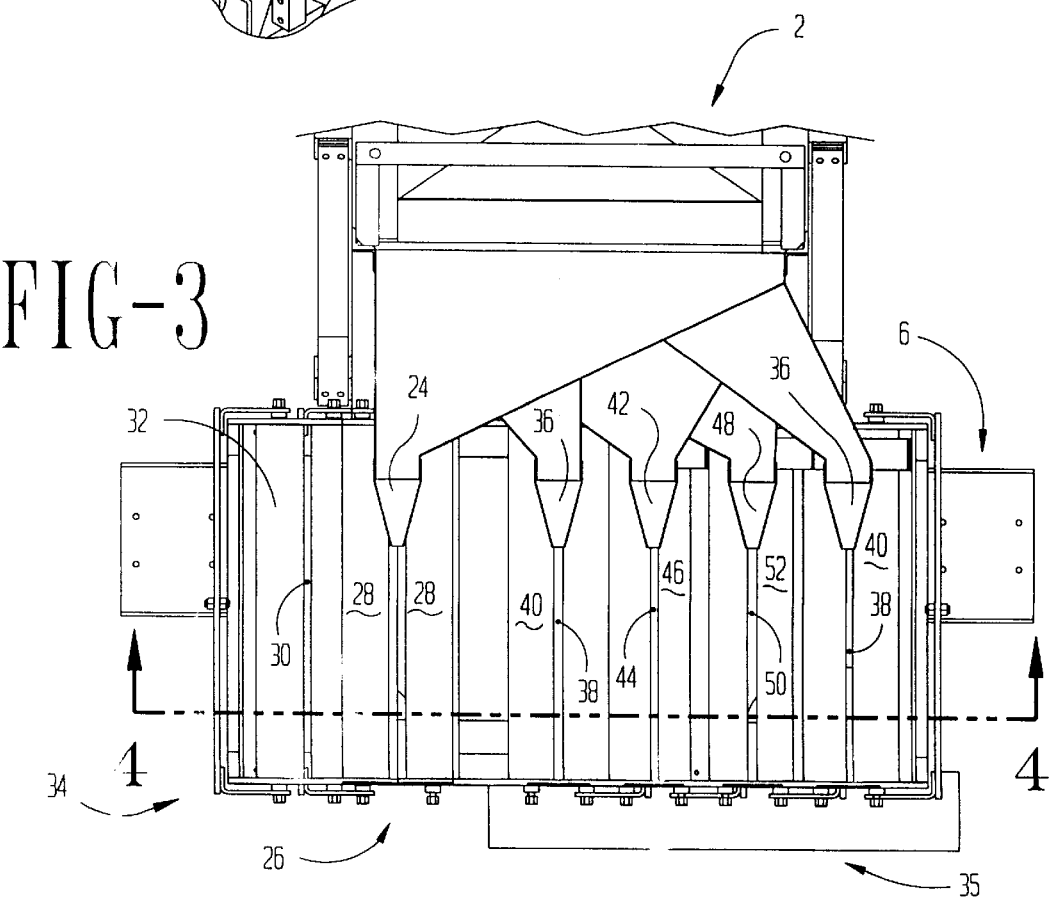
FIG. 3 is a top plan view of the thickness separating assemble of FIG. 1.
Figure 4:
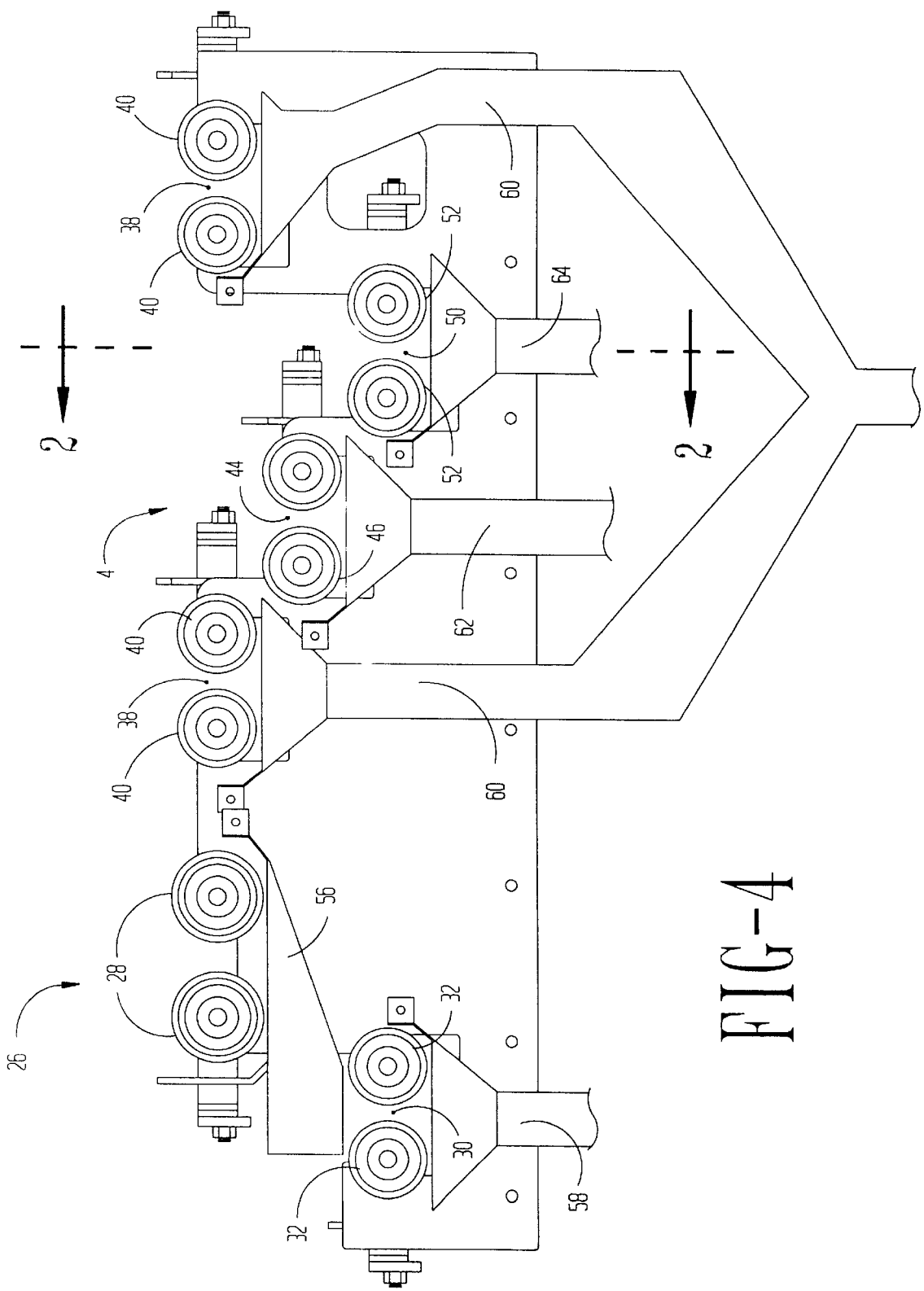
FIG. 4 is a sectional view taken substantially on line 4–4 of FIG. 3.
Figure 6:
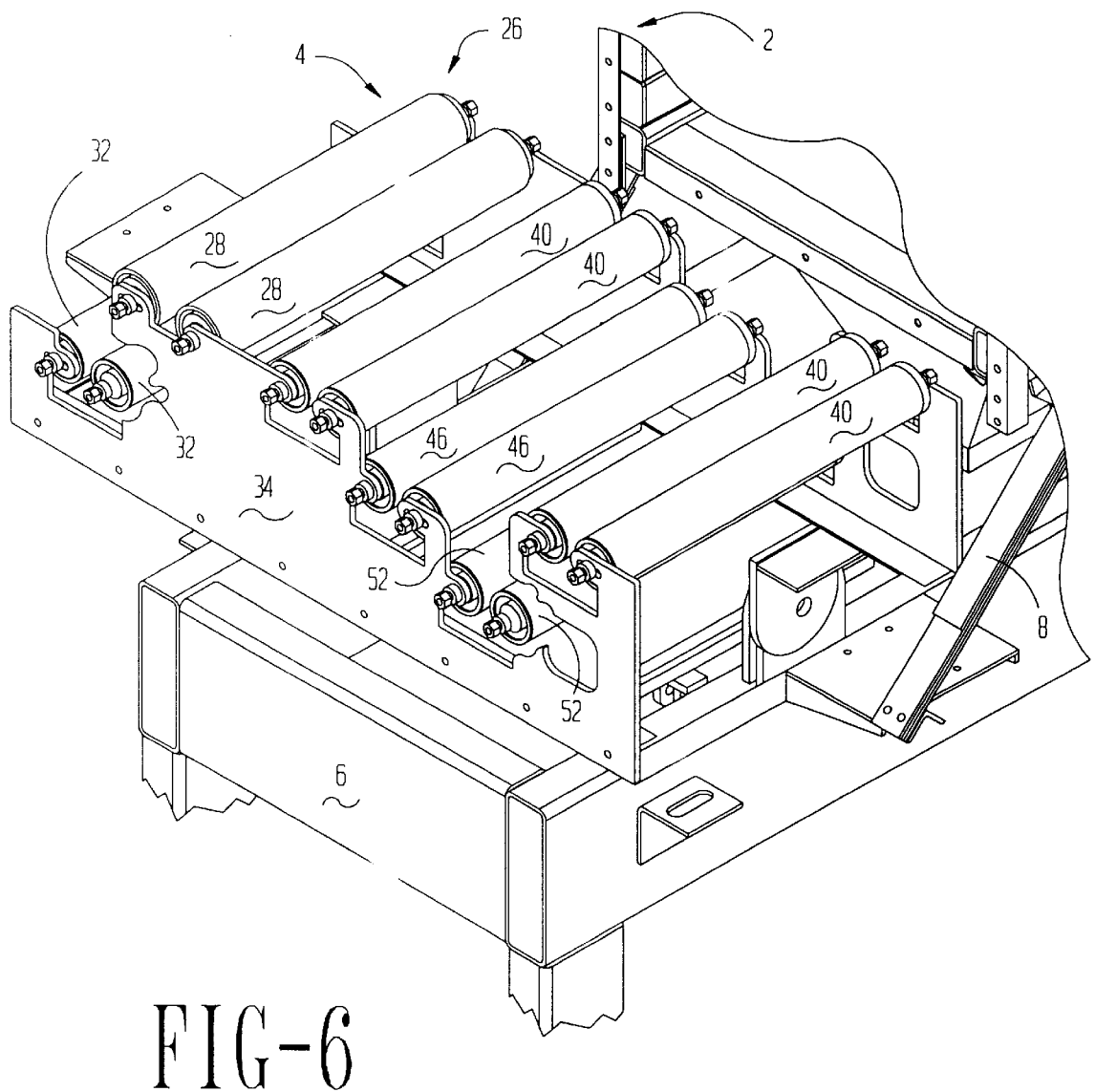
FIG. 6 is an enlarged perspective view of the thickness separator assembly of FIG. 1.
Figure 7:
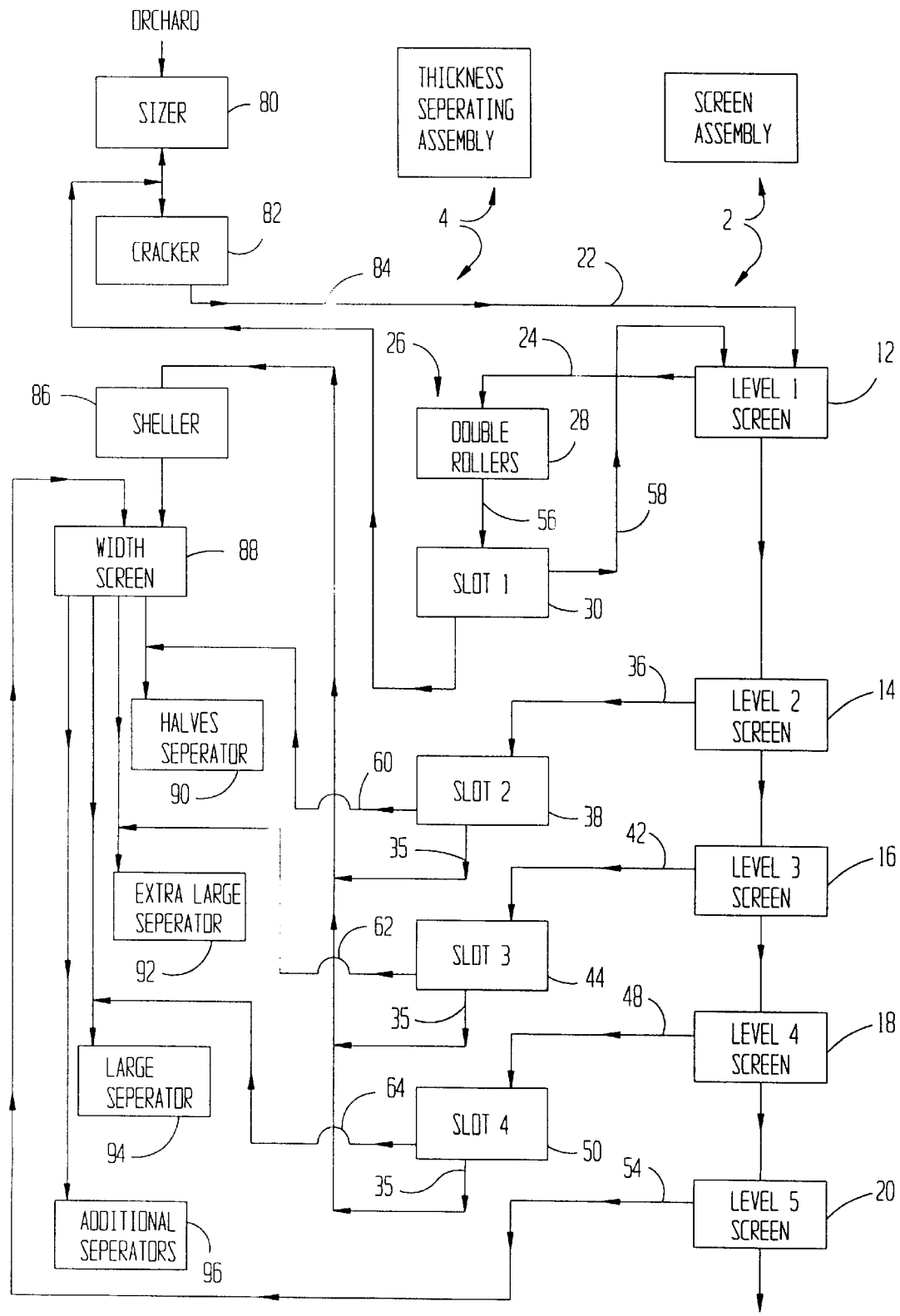
FIG. 7 is a flow diagram of one of the processes of this invention.

As an aid to correlating the terms of the claims to the exemplary drawing(s), the following catalog of elements and steps is provided:

FIRST EMBODIMENT 2 screen assembly
4 thickness separating assembly
6 frame
8 leaf springs
10 vibrating motor
12 level one screen
14 level two screen
16 level three screen
18 level four screen
20 level five screen
22 chute
24 level one chute
26 shelling-separation portion
28 rubber coated cylinder
30 level one slot
32 cylinders
34 product end
35 pan
36 level two chute
38 level two slot
40 cylinders
42 level three chute
44 level three slot
46 cylinders
48 level four chute
50 level four slot
52 cylinders
54 level five chute
56 pan for roller 28
58 pan for slot 30
60 pan for slot 38
62 pan for slot 44
64 pan for slot 50
66 axis
80 sizer
82 cracker -continued 84 cracker product
86 sheller
88 screens

AIR SEPARATOR 90 pecan halves
92 extra large
94 large
96 medium
96 small
96 midget

SECOND EMBODIMENT

2' screen assembly
100 first thickness separation assembly
102 second thickness separation assembly
103 third thickness separation assembly
104 sheller-separator assembly
106 feed end
108 first screen
110 second screen
112 third screen
114 fourth screen
116 first pan
118 second pan
120 third pan
122 fourth pan
124 exit portion of fourth screen
126 first bin
128 feed chute
129 motor
130 first thickness slot
132 second bin
134 feed chute
135 motor
136 second thickness slot
138 third bin
140 feed chute
141 motor
142 third thickness slot
144 fourth bin
146 feed chute
147 motor
148 sheller assembly
150 fourth thickness slot
152 frame
154 leaf springs
156 vibrator assembly
158 individual chute vibrator
200 pecan
201 shell
202 meat
203 tip or knob
204 notched cylinders
205 notch
T direction of nut travel

DESCRIPTION OF THE PREFERRED EMBODIMENTS

First Embodiment

In the first embodiment shown generally in FIGS. 1 through 6, the by-pass comprises three main elements: 1) screen assembly 2; 2) thickness separating assembly 4; and 3) frame 6.

The function of frame 6 is simply to support the other two main elements; namely, the screen assembly 2 and the thickness separating assembly 4.

The screen assembly 2 is mounted to the frame 6 by way of four leaf springs 8. The flexing of the leaf springs 8 produces vibratory movement of the screen assembly 2 at substantially 45° angles to the frame 6. The screen assembly 2 separates the product by width.

Vibrating motor 10 on the screen assembly 2 shakes the screen assembly 2. (FIG. 2).

Screen assembly 2 contains five screens of circular holes. The screens are the level one or uppermost screen 12, the level two screen 14, the level three screen 16, the level four screen 18, and the level five screen 20.

Cracker product 84, which comprises the pecan parts created in the cracking process, is fed to the screen assembly 2 through chute 22 at the feed end of the bypass. Chute 22 directs the cracker product to the level one screen 12. The level one screen 12 is formed by circular holes. By applying the cracker product to the level one screen 12 through chute 22, the pecan parts of the cracker product are effectively separated by width into two streams of flows. Those pecan parts with widths smaller than the diameter of the holes forming a level one screen 12 pass through the screen as a stream having a smaller size. Those pecan parts whose widths are too large to pass through the level one screen 12 as a stream having a larger size are forced toward the thickness separating assembly 4 by operation of the vibrating motor 10 creating oscillation in the screen assembly 2 as allowed by flexing of the leaf springs 8.

The hole diameter of the level one screen 12 is selected, according to pecan size, to not pass whole uncracked pecans, substantially whole cracked pecans or large sticktights. It will be understood that the size of the holes in the level one screen 12, and the remaining screens, will be adjusted according to the relative size of the pecans being shelled.

Pecan parts forced toward the thickness separating assembly 4 by operation of the oscillation of the screen assembly 2 are forced onto the level one chute 24. Each chute has a receiving end and a drop end and forms a transfer means. The level one chute 24, still by operation of oscillation of the width separating assembly 2, directs those pecan parts that could not fall through the level one screen 12 holes to the thickness separating assembly 4. More specifically, the level one chute 24 directs these pecan parts to shelling-separating portion 26 of the thickness separating assembly 4. Each chute hereinafter described forms a transfer means which associates a particular screen with a particular thickness separator-assembly or sheller-separator assembly or portion.

Pecan parts entering the shelling-separation portion 26 or bypass sheller of the thickness separating assembly 4 are fed to a pair of rubber coated parallel cylinders 28. These rubber coated cylinders 28 are rotating with respect to each other such that the direction of rotation as measured between them is substantially along the pull of gravity. These rubber coated cylinders are spaced to be slightly smaller than the thickness of the thickness range of pecans being shelled. Again, it will be understood that the spacing of the rubber coated cylinders 28 will change as different thickness pecans are being shelled in the overall process. The rubber coated cylinders 28 serve two purposes: 1) to pass unaffected whole, uncracked pecans; and 2) to further break the shell of substantially whole cracked pecans and large sticktights.

Whole, uncracked pecans are passed unaffected, and substantially whole cracked pecans and large sticktights are further broken by the cylinders 28. After passing the rubber coated cylinders 28, the pecan parts fall to the level one slot 30. The level one slot 30 is formed by two parallel rotating cylinders 32. These two parallel rotating cylinders are considered rigid elements inasmuch as their separation, once adjusted for a specific size pecan, does not change until readjusted. These rotating cylinders, as measured between them, are rotating substantially opposite the pull of gravity.

The rotating cylinders 32 are sloped toward product end 34 of the device. The product end 34 is at the sheller end of the bypass. Pecan parts that have passed the rubber coated cylinders 28 are applied to the level one slot 30 created by the rotating cylinders 32. Pecan parts that have thickness less than the width of the slot 30 will fall through the slot 30.

If the pecan parts have a thickness greater than the slot 30, gravity forces the pecan parts off the product end 34 of the rotating cylinders 32. Pecan parts that fall off the product end 34 of the rotating cylinders 32 represent whole uncracked pecans and substantially whole cracked pecans that were not further cracked by the rubber coated cylinders 28. Everything that falls off the product end 34 of the rotating cylinders 32 is returned to the cracker to be recracked. Those pecan parts that fall through the level one slot 30 are re-fed to the bypass.

Those pecan parts that fall through the level one screen 12 are further separated by width by the levels two, three, four, and five screens. Each screen separates the cracker product by size two streams. The hole diameter in the level two screen 14 is sized to not allow meat halves to pass through the screen. By operation of the vibrating motor 10 and the leaf springs 8, the meat halves separated by the level two screen 14 are forced toward the product end 34 of the device. A level two chute 36 directs the meat halves to a level two slot 38 in the thickness separating assembly 4. It will be understood that the meat halves separated by the level two screen may be either sticktights or sticktight free; therefore, the sticktights and sticktight free meat halves are applied to the level two slot 38 formed by counter-rotating cylinders 40. Similar to the cylinders 32 of the level one slot 30, the cylinders 40 of the level two slot 38 rotate substantially upward as measured between them in relation to gravity. The level two slot 38 then separates sticktight free meat halves, and shells of substantially the same size, from sticktight meat halves by thickness. The sticktight free meat halves and shells fall through the level two slot 38, while the sticktight meat halves slide down the cylinders 40 and fall off the product end 34. Those sticktight meat halves that fall off the product end 34 are fed to the sheller 86 of the prior art. The sticktight free meat halves and shells bypass the sheller of the prior art and go directly to an air separation 90 of the prior art.

The level three screen 16 of the width separating assembly 2 operates in conjunction with a level three chute 42 and a level three slot 44 formed by counter-rotating cylinders 46. The level three chute separates extra large meat parts from the remaining pecan product. By duplicate explanation of the level two screen separating and slot process, extra large sticktight free meat parts and shells of substantially the same size are separated from extra large sticktight meat parts by applying them to the level three slot 44 which effectively separates them by thickness. Just as on the level two separation process, the extra large meat parts that do not fall through the slot are sent to the sheller 86 of the prior art, while those extra large meat parts that do fall through the slot represent sticktight free extra large meat parts, and shells of substantially the same size, that are separated by air separator 92 of the prior art.

The level four screen 18 separates large pecan parts and feeds them to a level four chute 48 which directs them to a level four slot 50 formed by counter-rotating cylinders 52 as previously described for the other levels. From the cylinders 52, the parts are handled similarly as above.

The level five screen 20 separates medium, small and midgets pecan parts from the remaining pecan parts. The pecan parts are fed by a level five chute 54 to width screen 88 of the prior art. The width screen 88 then feeds the parts to the appropriate air separation units. Everything that falls through the holes of the level five screen 20 is considered dust and is thrown away.

The motor 10 has an eccentric weight on its shaft to produce vibration.

Pan 35 (FIGS. 2 and 3) collect the product which falls from the end of the slots 38, 44, and 50. This product is conveyed from the product end to the sheller 86 as described above. Pan 56 collects the product from the rubber rollers 28 and conveys it to the level one slot 30. Pan 58 collects the product which falls through the slot 30 so that it may be conveyed back to the chute 22 to go through the level one screen 12. Pan 60 collects the parts which fall through the level two slot 38 and conveys them to the halves air separator 90. Likewise the pan 62 for level three slot conveys the parts to extra large separator 92. Pan 64 collects from level four slot 50 and conveys them to large separator 94. Level five screen chute 54 conveys the product to the width screen separator 88 of the plant to be directed to additional separators 96.

FIG. 1 illustrates an unidentified cover over the two rubber coated rollers 28.

The above explanation is a generic description of the pecan by-pass of this invention. As an example, the following screen sizes were used with a number 15 pecan size, i.e. $^{15}/_{16}$" whole pecan thickness. The level one screen 12 had a hole diameter of $^{11}/_{16}$". The level two screen 14 had a hole diameter of $^{9}/_{16}$". The level three screen had a hole diameter of $^{7}/_{16}$". The level four screen had a hole diameter of $^{5}/_{16}$". The level five screen had a hole diameter of $^{2}/_{16}$". These screens were sized to sort whole uncracked and substantially whole cracked, meat halves, extra large meat, large meat, medium, small and midget respectively.

The slot widths between the rollers are less than the hole size of the screens from which they are fed. The slot width may be adjusted as needed for each batch of nuts processed. The rollers tilt downward from the screen to the product end. The thickness separating assembly 4 may be rotated about axis 66 to adjust the downward angle which sill usually be between 10° and 30°.

Second Embodiment

A second embodiment of this invention may be seen generally in FIGS. 8, 9, 13, and 14. This embodiment comprises five main elements; screen assembly 2'; first thickness separation assembly 100; second thickness separation assembly 102; third thickness separation assembly 103; and sheller-separator assembly 104.

Figure 8:
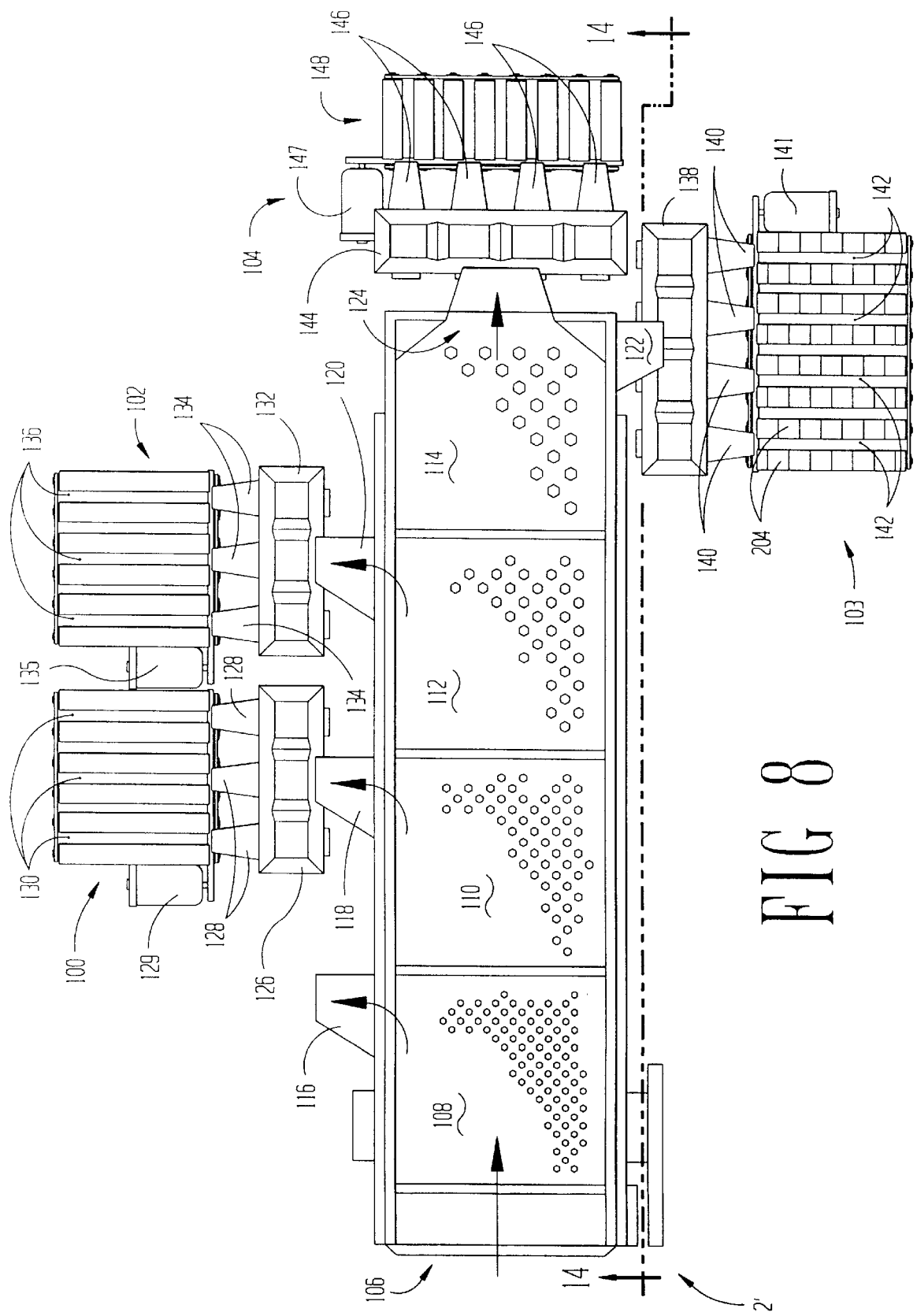
FIG. 8 is a top plan view of the second embodiment of this invention.
Figure 9:
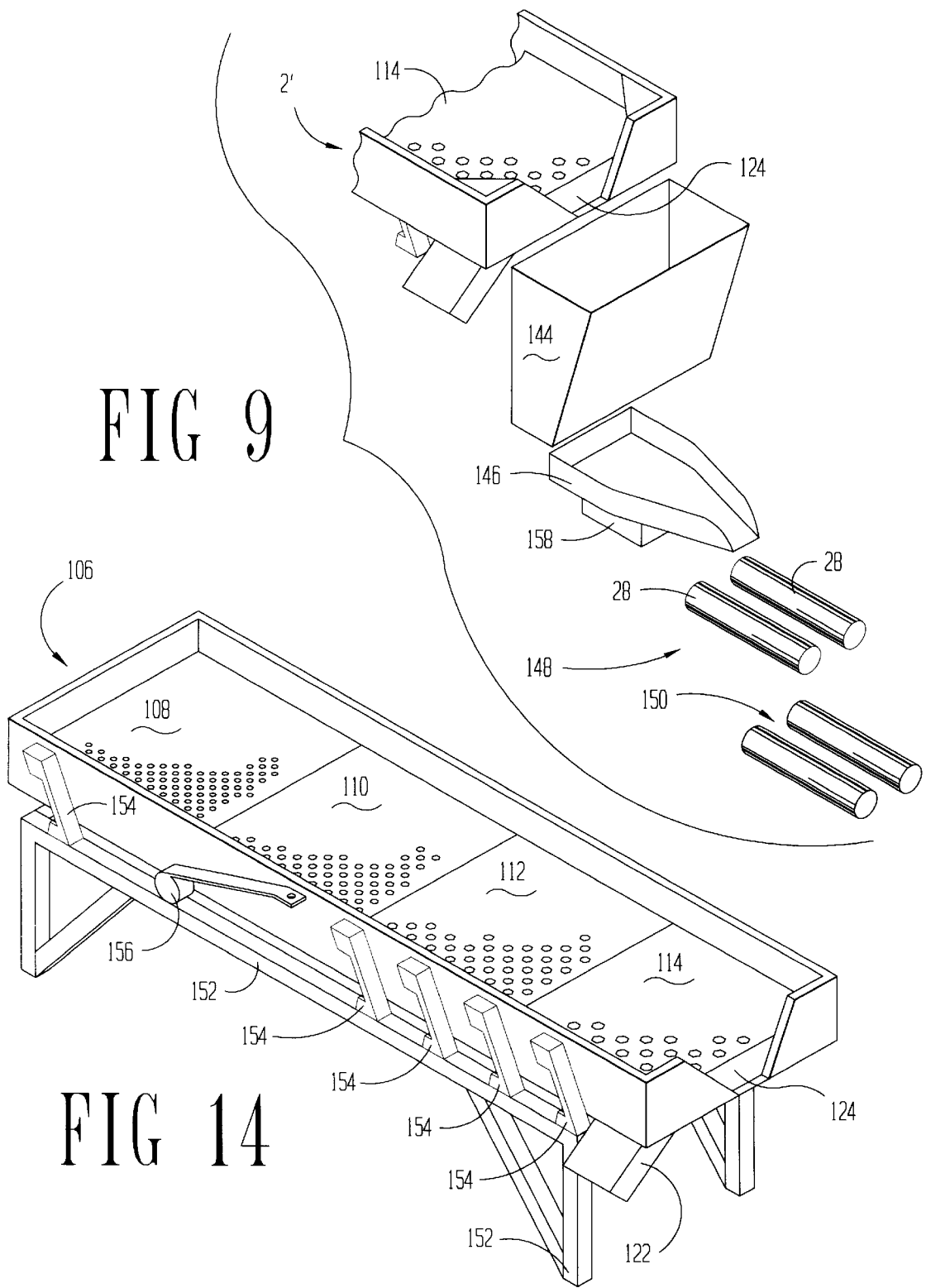
FIG. 9 is a perspective side view of the sheller-separator assemble with a frame portion removed for clarity.

Cracker product, or nut parts, from a plant cracker are fed to this embodiment at the feed end 106 of the device. The screen assembly 2' of this embodiment comprises four substantially coplanar screen sections being a first screen 108, a second screen 110, a third screen 112, and a fourth screen 114. The first screen 108 has a plurality of uniform size holes as shown in FIG. 8. The holes in the first screen 108 are sized to allow mediums, smalls, midgets, and dust to fall through. In other words, the holes of the first screen 108 make a first separation of the cracker product by width into two streams or flows allowing only those nut parts with widths equal to or smaller than medium meat parts to fall through as a smaller size stream. Those portions of the cracker product that fall through the first screen 108 fall into a first pan 116 which is located directly below the first screen 108. First pan 116 directs the nut parts to a series of screens 88 of the prior art for further separation and application to air separators.

That portion of the cracker product that does not fall through the first screen 108, the larger size stream is conveyed, by operation of a vibratory motion of the entire screen assembly 2', to the second screen 110. The second screen 110 has a plurality of holes therein that are sized to allow large pecan parts to fall through. It will be understood that if the mediums, smalls, or midgets were still integral with the cracker product those size graduations would fall through the second screen 110; however, the medium, small, and midget graduations are already separated by the first screen 108 such that only the large meat pieces, and shells of the substantially same size, fall through the second screen 110. Located directly below the second screen 110 is a second pan 118.

The second pan 118 directs by means of a chute portion the large pecan parts and shells of substantially the same size that have fallen through the second screen to the first thickness separation assembly 100. The first thickness separation assembly 100 comprises a first bin 126, three feed chutes 128 lying below and feedingly connected to the first bin 126, and three thickness slots 130. The three chutes and slots are considered a plurality of chutes and slots.

Large pieces and shells of substantially same size that fall through the second screen 110 are fed via pan 118 to the first bin 126. This graduation of the nut parts tends to accumulate in the first bin until an equilibrium depth is reached therein. The feed chutes 128 of the first thickness separation assembly 100 direct the large meat pieces and shells of substantially the same size on to the thickness separation slots. These thickness separation slots are the same as the thickness separation slots in the first embodiment. Namely, the slot is formed by a pair of counter rotating parallel cylinders. The large meat is applied to the parallel rotating cylinders and is thereby discriminated or separated based on thickness. Those large pieces having the woody shell still attached will not fall through the slot and instead fall off the end of the thickness slot 130. That portion of the nut parts that fall off the end of first thickness slot 130 is directed to the sheller of the prior art. That portion of the nut parts that fall through the thickness slot represent sticktight free large pieces and shells of substantially the same size. These parts bypass the sheller of the prior art and go directly to the air separation assemblies 88 of the prior art. Each feed chute 128 has an individual vibrator assembly (not shown) that operates to force the pecan parts, that fall from the bin onto the feed chute, toward the thickness separation slot. Having an individual feed chute vibrator assembly allows for individual control such that a relatively uniform depth of nut parts can be controlled in the feed bin at equilibrium.

Those portions of the cracker product or nut parts that do not fall through either the first screen 108 or the second screen 110 are conveyed by operation of a vibratory movement of the screen assembly 2' to the third screen 112. The holes in the third screen 112 are sized such that extra large pieces and shells of the substantially same size are allowed to fall through. Directly below the third screen 112 is the third pan 120. The third pan 120 gathers the nut parts of this graduation and directs them by means of a chute portion to a second bin 132 of the second thickness separation assembly 102.

In a duplicative explanation of the first thickness separation assembly 100, the second thickness separation assembly 102 comprises a second bin 132 which accumulates the extra large meat parts and shell of substantially the same size. Below and feedingly connected to the second bin 132 are feed chutes 134. The feed chutes 134 direct the extra large graduation of nut parts from the feed bin 132 to a plurality of second thickness slots 136. These second thickness slots 136 work exactly the same as the thickness slots previously described; namely, the slots formed between pairs of counter rotating parallel cylinders are dimensioned such that sticktight free extra large meat pieces, and shells of substantially the same size, fall through the slots formed thereby. Extra large sticktights will not fall through said slot and will instead fall off the end of a second thickness slot 136. That portion of the extra large graduation that fall off the end of a second thickness slot 136 represents sticktight extra large meat, and shells of the substantially same size, which are then conveyed to the sheller of the prior art. Those meat pieces that fall through the second slot 136 represent sticktight free extra large meat that are then conveyed to the respective air separators of the prior art.

Just like in the first thickness separation assembly 100, each feed chute 134 of the second thickness separation assembly 102 have individual vibrator assemblies (not shown) to facilitate individual control of the feed rate of the particular pecan part graduation in the respective feed bin 132.

That portion of the cracker product or nut parts that do not fall through the first screen 108 through the third screen 112 is conveyed, by vibratory movement of the screen assembly 2', to the fourth screen 114. The fourth screen 114 has a plurality of uniform size holes that are sized to allow meat halves and shells of the substantially same size to fall through. This graduation of nut parts that fall through the fourth screen 114 is collected by the fourth pan 122 which lies directly below the fourth screen 114. The fourth pan 122 directs by means of a chute portion this graduation of nut parts to the third thickness separation assembly 103.

This third thickness separation assembly 103 comprises a third feed bin 138, four feed chutes 140, and four thickness slots 142. This graduation accumulates in the third bin 138 and is directed by feed chutes 140 to the thickness slots 142. Just like the previous thickness separation assemblies, the feed chutes 140 of this thickness separation assembly each have individually controlled vibrator assemblies (not shown). This thickness separation assembly however differs from the other thickness separation assemblies in terms of the structure of the slots 142.

Figures 10, 11:
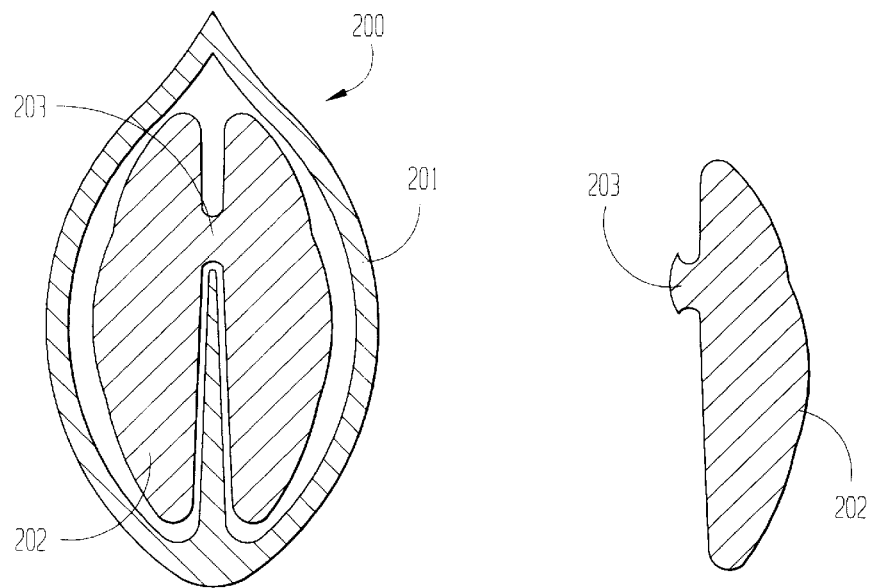
FIG. 10 is a cross-sectional view of a pecan in its shell.
FIG. 11 is a cross-sectional view of a meat half with the tip portion still attached.
Figure 12:
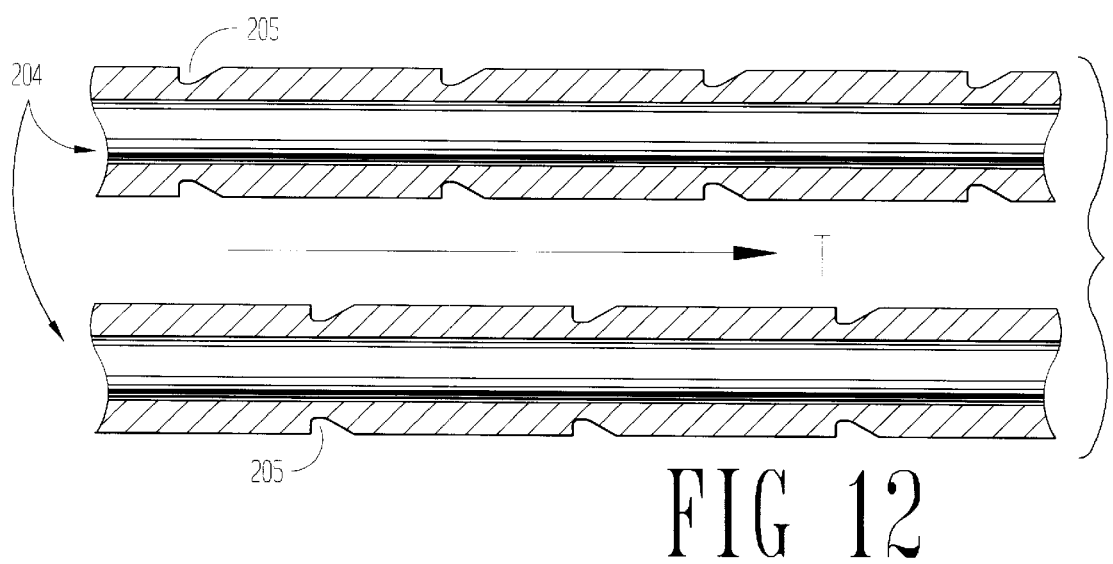
FIG. 12 is a cross-sectional view of a notched cylinder pair.

FIG. 10 shows a cross-section of a pecan 200 in its shell. The pecan 200 comprises a woody outer shell 201 and meat 202 contained therein. As indicated in the figure, the meat portions 202 are connected at tip 203. This tip 203 is meat 202 just as much as any other portion of the meat half. This tip however presents a problem in that when the pecan is cracked and a meat half is freed, randomly a portion of this tip 203 remains attached to the meat half 202 as seen in FIG. 11. This tip portion 203 presents a problem when performing operations to separate sticktight halves from sticktight free halves in that the tip portion 203 may make the overall thickness of the meat half 202 substantially the same as a sticktight. In other words, the tip portion 203 gives an added thickness to an otherwise sticktight free meat half such that the thickness separation slots may misread the particular meat half as being a sticktight. To compensate for this random appearance of the tip 203 staying attached to the meat half 202, the parallel rotating cylinders of the third thickness slots 142 have a notch 205 periodically along their radius. As between each cylinder of a parallel rotating cylinder pair, the notches are offset such that no two notches lie in the same plane. (FIG. 12) Operation of the thickness separation in the third thickness slot 142 is as follows: a meat half will travel down the feed chute 140 and be applied to a thickness slot 142. The notched rotating cylinders 204 are spaced such that the pecan half must orient itself with its thickness between the two cylinders. If the meat half is sticktight free and further does not have a tip 203 portion still attached, the distance between the two cylinders allows this meat half to fall directly through. If the meat half has a portion of the shell remaining, a sticktight, this additional shell makes the overall thickness of the meat half too great to fall through the slot formed by the parallel rotating cylinders. This sticktight meat half is pulled by gravity in the direction T the length of the parallel rotating cylinders and falls off the end. Finally, if an otherwise sticktight free meat half is applied to the parallel rotating cylinders, but this meat half has the tip 203 portion, the overall thickness does not allow it to fall through the slots; however, as the half moves along the notched cylinders 204, as pulled by gravity, the tip 203 at some point will align with a notch 205 in the notched cylinder 204 and therefore will be able to fall through the slot.

So, the third thickness separation assembly 103 works substantially the same as the other two thickness separation assemblies save the fact the cylinders of the parallel rotating cylinders creating the thickness slots are notched to compensate for the random occurrence of a tip 203 remaining attached to a meat half 202. Those portions of the meat halves that fall through the thickness slot represent sticktight free halves which are fed to the air separator of the prior art. Those portions of the nut parts that do not fall through the thickness slots represent sticktight halves and are fed to the sheller of the prior art.

That portion of the cracker product or nut parts that have not fallen through any of the four screens as described fall off the exit portion 124 of the fourth screen 114. Those nut parts that would exit the screen assembly 2' via the exit portion 124 represent whole uncracked nuts and substantially whole cracked nuts that have widths larger than any of the holes in the described four screens. This graduation of nut parts is fed by the exit portion 124 to the sheller-separator assembly 104.

The sheller separator-assembly 104 comprises a fourth bin 144, feed chutes 146, sheller 148, and fourth thickness slots 150.

From the fourth bin 144 the nut parts are fed by means of feed chutes 146 to the sheller assemblies 148. As described for the other thickness separation assemblies, the feed chutes 146 of the sheller-separator assembly 104 each have individual vibrator assemblies 158. (FIG. 9) The sheller assemblies 148 of this embodiment are substantially the same as the sheller assemblies described for the previous embodiment. That is, each portion of sheller assembly comprises a pair of parallel rubber coated cylinders rotating substantially downward as measured between them. Nut parts being applied to the sheller assemblies 148 represent whole uncracked and substantially whole cracked nuts that were too large to fall through the screens as previously described. The distance between the parallel rubber coated cylinders is slightly less than the thickness of the nut parts being applied thereto such that if the nuts are cracked, the sheller assembly 148 further cracks them. Whole uncracked nuts pass unaffected through the sheller assembly 148. Everything that goes through the sheller assembly 148 is then fed to a fourth thickness slot 150. Everything that falls through the fourth thickness slot 150 is reapplied to the feed end 106 of the screen assembly 2', and everything that does not fall through the fourth thickness slot 150, representing mostly whole uncracked nuts, is fed to the cracker.

It will be noted that as between the first described embodiment and the second described embodiment there are more thickness separation slots formed by parallel rotating cylinders. It is certainly within the contemplation of this embodiment to have only one thickness separation slot for each graduation of nut parts. The number of thickness separation slots is a function of the volume of cracker product fed to the bypass. The second described embodiment is designed to handle a volume of nuts produced by two standard cracker units. That is, this second embodiment is designed to handle at least 1600 cracks per minute representing 1600 pecans cracked and applied to this device per minute. It would be within the contemplation of this device to be able to separate more than 1600 cracked pecans per minute, and as such the unit would require more thickness separation slots. Likewise, if the device was designed to handle fewer cracks per minute, then each thickness separation assembly would require fewer thickness separation slots.

It has been generally described that the thickness separation slots are formed by parallel rotating cylinders. Those slots performing thickness discrimination have been generally described as parallel rotating cylinders rotating substantially upward as measured between them. It will be understood that it is within the contemplation of this invention that those two cylinders are not necessarily turning at the same rotational speed. Indeed, it has been found that turning one of the pair of the parallel rotating cylinders at a faster rotational speed than the other aids in the thickness separation process. One of the ways the difference in rotational speed aids in this process is by diminishing the occurrence of 'bridging' between the cylinders. That is, the different rotational speeds will not allow pecan parts to ride on the upper surfaces of each rotating cylinder, but rather, by the difference in speed the pecan parts are always forced down between the two cylinders. Likewise, the rubber coated parallel rotating cylinders in the sheller-separator assembly turn at different rotational speeds to aid in further shelling the substantially whole cracked pecans.

Each of the three thickness separation assemblies as well as the sheller-separator assembly have a single motor and a serpentine belt that turns all of the parallel rotating cylinders whether they be rubber coated or not. One with ordinary skill in the art can easily duplicate such a system by snaking the belt around various pulleys to accomplish the task of turning all the cylinder pairs of a separator assembly with a single motor and having the respective rotations accomplished.

Though not shown in the drawings, it is within the contemplation of this invention to have over the exit portion of each of the four pans an aspirator. The aspirator is a wand-like structure just slightly above the exit portion of each pan. The aspirator's purpose is to pick-up small pieces of woody shell and other light nut parts. This is accomplished by a suction at the wand individually adjusted for each graduation of nut parts. Aspirators are well known in this art.

It will be understood that in the second described embodiment where the screens are substantially coplanar that the screen assembly 2' need not be sloped. Movement of the nut parts along the screen assembly 2' is accomplished by the vibratory movement of the screen itself.

The means of vibrating the coplanar screens of the second embodiment have not been described in detail. It has been indicated in drawing FIG. 14 that they are supported by leaf springs 154 which limit their movement. Vibrator assembly 156 in combination with leaf springs 154 vibrates the screen assembly 2'.

The pans to collect the product which falls through the holes of each screen are below and parallel to the screens themselves. Between the collection pans and the screens there are a series of rubber balls which have a diameter slightly smaller than the distance from the screen to the pan. These rubber balls aid in the operation of the screens. Particularly, the balls aid in the cleaning of the screens by prohibiting the individual openings of the screen becoming plugged with nut parts only partially extending through the openings. Such arrangements of both the vibration of the screen and the use of balls are well known in the art. Such structures are commercially available from more than one manufacturer.

The embodiments shown and described above are only exemplary. I do not claim to have invented all the parts, elements or steps described. Various modifications can be made in the construction, material, arrangement, and operation, and still be within the scope of my invention.

For example, the belt drive mechanism to rotate the various cylinders has not been described in detail in as much as those having ordinary skill in the art will readily understand how to rotate the cylinders by intertwined belt. Also, as discussed, the width of the slots between the cylinders is adjusted. The provisions for manual adjustment of the width of the spacing between the cylinders of a pair or the remote adjustment of the spacing between the cylinders of a pair will be readily apparent to those with skill in the art.

The term graduation has been used in this specification to describe portions of cracker product removed by application to screens. Generally these graduations have been a single graduation, that is, a single step in the defined ranges of sizes of pecan parts. However, it will be understood that the term graduation is not limited to a single step in sizes of pecans parts, but rather, could encompass a plurality of steps including all but a single extreme. The term extremities or extreme means a graduation of sizes of pecan parts from either a large extreme or a small extreme. In other words, a graduation extremity will always include either the largest or the smallest pecan part size.

Also, although the invention has been described as pertaining to pecans, those skilled in the art will understand that the invention also pertains to other nuts, for example, walnuts.

Likewise, the mounting of different sized screens within the screen assembly will be known. Also, the holes in the screens are described as circular, but those with ordinary skill in the art will understand that hexagonal holes would also be operable and perhaps in the smaller size even square holes would work equally well.

It will be understood that of the two embodiments described, each embodiment could be a preferred embodiment depending upon the circumstances of the installation. The stacked embodiment of this invention would be the preferred embodiment if space was limited, as for instance, installation in an existing nut shelling plant. If, on the other hand, it was desired the invention be used in a new nut shelling plant or in a plant where space was not a consideration, then the second embodiment with the substantially coplanar screens would be the preferred embodiment. The second embodiment allows for easier access for maintenance and for periodic cleaning of the screens. As may be seen in the drawings for the stacked embodiment, cleaning of the screens requires disassembly of the screen assembly which is labor intensive and time consuming.

The restrictive description and drawings of the specific examples above do not point out what an infringement of this patent would be, but are to enable one skilled in the art to make and use the invention. The limits of the invention and the bounds of the patent protection are measured by and defined in the following claims.

What is claimed is:

1. A structure of a pecan sheller bypass comprising:
   a) a cracker product feed chute, feedingly connected to
   b) a plurality of stacked vibrating screens, including;
      i) a first screen with a largest hole dimension less than a width of a whole pecan in a whole pecan size category,
      ii) a second vibrating screen with a largest hole dimension less than a meat half width of the whole pecan size category,
      iii) a third vibrating screen with a largest hole dimension less than an extra large meat width of the whole pecan size category,
      iv) a fourth vibrating screen with a largest hole dimension less than a large meat width of the whole pecan size category,
      v) a fifth vibrating screen with a largest hole dimension less than medium, smalls and midgets,
   c) a bypass sheller fed by a screen chute connected to said first vibrating screen,
   d) said bypass sheller comprising a pair of rubber coated cylinders rotating substantially downward as measured between them,
   e) a plurality of slots,
   f) each of said slots formed between a pair of cylinders rotating substantially upward as measured between them,
   g) a first slot fed by the screen chute connected to said first screen,
   h) each of said vibrating second through fifth screens feedingly connected to one each of said remaining slots
   i) means for feeding the cracker product which falls through the slots to the air separators, and
   j) means for feeding the cracked product which does not fall through the slots to said plant sheller.

2. The structure of a pecan sheller bypass in a pecan shelling plant having,
   a) a cracker which creates cracker product,
   b) a sheller which separates meat from shells of sticktights, and
   c) air separators which separate the meat and shells freed from each other,
wherein the improved structure comprises:
   d) a cracker product chute feedingly connected to
   e) a series of coplanar screens, including
      i) a first screen with a hole dimension to allow mediums, smalls, and midgets to fall through,
      ii) a second screen with a hole dimension to allow large meat of a whole pecan size category to fall through,
      iii) a third screen with a hole dimension to allow extra-large meat of the whole pecan size category to fall through,
      iv) a fourth screen with a hole dimension to allow meat halves of the whole pecan size category to fall through,
   f) a first through fourth pan, each pan having a receiving portion and a chute portion,
   g) each receiving portion of said first through fourth pans attached directly below each first through fourth screens respectively,
   h) a first thickness separation assembly below a chute portion of the second pan, including
      i) a first feed bin, said feed bin below the dump end of the second pan,
      ii) three feed chutes, said chutes below and feedingly connected to said first feed bin,
      iii) three feed chute vibrator assemblies, one each of said vibrator assemblies attached to each of said feed chutes,
      iv) a plurality of thickness slots formed between pairs of parallel rotating cylinders, said cylinders rotating upward as measured between them,
      v) one each of said parallel rotating cylinder pairs below and feedingly connected to one each of said feed chutes,
   j) a second thickness separation assembly below a chute portion of said third pan,
      i) a second feed bin, said feed bin below the dump end of the third pan,
      ii) three feed chutes, said chutes below and feedingly connected to said second feed bin,
      iii) three feed chute vibrator assemblies, one each of said vibrator assemblies attached to each of said feed chutes,
      iv) a plurality of thickness slots formed between pairs of parallel rotating cylinders, said cylinders rotating upward as measured between them,
      v) one each of said parallel rotating cylinder pairs below and feedingly connected to one each of said feed chutes,
   k) a third thickness separation assembly below a chute portion of said fourth pan, including
      i) a third feed bin, said feed bin below the dump end of the fourth pan,
      ii) four feed chutes, said chutes below and feedingly connected to said feed bin,
      iii) four feed chute vibrator assemblies, one each of said vibrator assemblies attached to each of said feed chutes,
      iv) a plurality of thickness slots formed between pairs of parallel rotating cylinders, said cylinders rotating upward as measured between them,
      v) one each of said parallel rotating cylinder pairs below and feedingly connected to one each of said feed chutes,
      vi) a plurality of circumferential notches on each cylinder of said parallel rotating cylinders, said notches offset as between each pair of cylinders such that a portion of the notches are on different planes,
   l) said fourth screen having an exit portion where that portion of the cracker product that has not fallen through any screen section of the coplanar screens leaves a screen assembly formed by the coplanar screens,
   m) a bypass sheller assembly below and feedingly connected to said exit portion of said fourth screen
      i) a fifth feed bin below said exit portion of said fourth screen,
      ii) four feed chutes below and feedingly connected to said fifth feed bin,
      iii) four vibrator assemblies, one each vibrator assembly connected to each of said feed chutes,
      iv) four pairs of parallel rubber coated cylinders that rotates substantially downward as measured between each pair, one each of said parallel rubber coated cylinder pairs below each of said feed chutes,
   n) a fourth thickness separation assembly having,
      v) a plurality of thickness slots formed between pairs of parallel rotating cylinders, said cylinders rotating upward as measured between them, vi) one each of said parallel rotating cylinder pairs below and feedingly connected to one each of said pairs of rubber coated cylinders, o) a means for conveying that portion of the cracker product which falls through any of the thickness slots to the air separators, p) a means for conveying that portion of the cracker product which does not pass through the first through third separation assembly's thickness slots to said plant sheller, q) a means for conveying that portion of the cracker product which falls through the fourth thickness separation assembly's thickness slots to said first screen, r) a means for conveying that portion of the cracker product which does not fall through the fourth thickness separation assembly's thickness slots to said cracker.

3. In a nut shelling plant having a cracker which creates a cracker product and the plant also has a sheller; a bypass structure for reducing the volume of cracker product which is fed to the sheller, said bypass structure comprising:

a) a cracker product chute feedingly connected to a screen having a plurality of uniform sized holes which separate by width graduation the cracker product into a first graduation stream and a second stream of other graduation, and b) transfer means for transferring the first graduation stream of product to a thickness measuring structure which separates by thickness the product and conveying means for bypassing the sheller with the product having lesser thickness.

4. The structure as defined in claim 3 further comprising:

c) said screen being a first screen for separating cracker product nut parts of a universe of nut parts by the width of said nut parts, d) said nut parts having graduated width sizes from a large extreme to a small extreme, e) said first stream having a first graduation of width of one extreme from said second stream which is all other graduations of the universe, f) a means for transferring said second stream from the first screen to a second screen with uniform holes which separate nut parts in a second graduation of width size from a third stream which is all other graduations of the universe, and g) a means for transferring said third stream of all other graduations from the second screen to a third screen having uniform holes which separate nut parts in a third graduation width size from another stream of all other graduations, of width size.

5. The structure as defined in claim 3 further comprising:

c) a screen assembly comprising a series of stacked vibrating screens, said screen being one of the vibrating screens, d) each stacked screen, having a plurality of uniform sized holes which except one are larger than the holes in an adjacent screen, e) said structure including a plurality of chutes, each chute having a receiving end and a drop end, one chute attached to and fed by each of the screens, and f) a plurality of slots, said thickness measuring structure being one of the slots, each of the slots formed between two rigid elements, one slot below the drop end of each chute, g) each slot having a width which is less than a hole dimension of the holes in the screen which feeds the respective chute.

6. The structure as defined in claim 5 further comprising:

h) some of said slots formed between a pair of parallel rigid cylinders, i) the rigid cylinders rotating substantially upward as measured between them.

7. The structure as defined in claim 6 further comprising:

j) a plurality of circumferential notches on some of the cylinders of said parallel rotating cylinders, k) said notches offset as between the two cylinders such that a portion of the notches are on different planes.

8. The series of vibrating screens as defined in claim 5 further comprising:

h) a first vibrating screen with each hole's largest dimension less than a width of a whole nut in a whole nut size category, i) a second vibrating screen with each hole's largest dimension less than meat half width of the whole nut size category, j) a third vibrating screen with each hole's largest dimension less than an extra large meat width of the whole nut size category, k) a fourth vibrating screen with each hole's largest dimension less than a large meat width of the whole nut size category, and l) a fifth vibrating screen with each hole's largest dimension less than smalls and granules.

9. The structure as defined in claim 8 further comprising:

m) a bypass sheller formed by a pair of parallel rubber coated cylinders that rotate substantially downward as measured between them, n) said bypass sheller between the slot and the chute associated with said first vibrating screen.

10. The structure as defined in claim 5, said shelling plant also having, h) air separators which separate the meat and shells freed by the sheller, further comprising:

i) means for feeding the cracker product which falls through one of the slots to one of the air separators, and j) means for feeding the cracker product which does not fall through that slot to said sheller.

11. The structure as defined in claim 3 further comprising:

c) a screen assembly comprising a plurality of screen sections, said screen being one of said screen sections, feedingly connected such that cracker product that does not fall through a screen section is conveyed to an adjacent screen section, d) each screen section except one having a plurality of uniform sized holes which are larger than holes of an adjacent screen, e) said association being a plurality of pans, each pan having a receiving portion and a chute portion, f) the receiving portion of each pan mounted below one of each screen section, and g) a plurality of slots, said thickness measuring structure being one of the slots, each of the slots formed between two rigid elements, one slot below each chute portion of each pan.

12. The structure as defined in claim 11 further comprising:

h) a first screen section with the hole diameter less than a large meat width of a whole nut size category, i) a second screen section adjacent to the first screen section with the hole diameter less than an extra large meat width of the whole nut size category, j) a third screen section adjacent to the second screen section with the hole diameter less than a meat half width of the whole nut size category, k) a fourth screen section adjacent to the third screen section with the hole diameter less than the whole nut width of the whole nut size category.

13. The structure as defined in claim 11 further comprising:

h) said slots being thickness slots formed between a pair of parallel rigid cylinders, i) said rigid cylinders rotating substantially upward as measured between them.

14. The structure as defined in claim 13 further comprising:

j) a plurality of circumferential notches on each cylinder of said parallel rotating cylinders, k) said notches offset as between the two cylinders such that a portion of the notches are on different planes.

\* \* \* \* \*